Feb. 8, 1966   J. D. NAILLON ET AL   3,233,376
SHEAR UNIT AND SHEAR CONNECTION BETWEEN STRUCTURES
Filed April 17, 1962   4 Sheets-Sheet 1

Feb. 8, 1966    J. D. NAILLON ET AL    3,233,376
SHEAR UNIT AND SHEAR CONNECTION BETWEEN STRUCTURES
Filed April 17, 1962    4 Sheets-Sheet 3

United States Patent Office 3,233,376
Patented Feb. 8, 1966

3,233,376
SHEAR UNIT AND SHEAR CONNECTION
BETWEEN STRUCTURES
Jacob D. Naillon, Walnut Creek, and Karl H. Middendorf, Costa Mesa, Calif., by Olive A. Middendorf, executrix of said Karl H. Middendorf, deceased, assignors to Prescon Corporation, Corpus Christi, Tex., a corporation of Texas
Filed Apr. 17, 1962, Ser. No. 188,130
16 Claims. (Cl. 52—264)

The invention relates to structural shear units, that is, to devices which provide a connection between a supporting structure and a supported structure while permitting relative horizontal motion under certain conditions. Such relative motion occurs, for example, due to loading and/or pre-stressing of one or both of such structures or due to seismic stress. The invention is further directed to a connection between structures wherein one or more of such shear units is/are employed.

Specific examples of such connections are that between a foundation embedded in the ground and a concrete tank wall mounted thereon, wherein the wall may or may not have tendons for pre-stressing the wall, and that between the top of such a wall and a roof or beam resting on the wall and spanning the interval between spaced parts of the wall.

Provision for relative horizontal movement must often be made between a supporting and a supported struture. For example, when a cylindrical concrete wall of a tank which is mounted on a foundation is pre-stressed by circumferential steel tendons, the wall radius is reduced and the base of the wall must move radially inwards on its foundation; and when a tank is filled with liquid, hydrostatic pressure expands the wall, resulting in a radially outward movement of the wall base on the foundation. Also, when an earthquake occurs, there is a horizontal movement of the foundation which should not in all cases be accompanied by an equal movement of the supported structure. Similarly, when such a wall supports, at the top or at any intermediate level, a structure such as a roof or a beam, radial movement of the contiguous part of the wall necessitates a movement relatively to the supported structure.

Moreover, in installations including a structure which possesses a greater stability along one horizontal axis than another, such as a wall, it is often desirable to provide for facile relative motion between the conjoined structures along the latter axis and to restrain such motion along the former, either partially or completely, depending upon the installation. In particular, when an earthquake moves a foundation horizontally, a wall mounted thereon should slide along the axis normal to itself but not along the wall. The same desiderata obtain when a structure is shifted due to loading or pre-stressing along one axis. For example, when the previously mentioned tank wall is pre-stressed by applying circumferential tension or is loaded by the liquid contained, the wall moves principally in the radial direction, i.e., normal to its face. It is desirable to mount such a wall on its foundation so as to permit substantially free radial motion thereon but to prevent or limit circumferential motion between the wall and its foundation. Similarly, it is desirable to mount the tank roof—when such roof is contracted radially by pre-stressing after emplacement on the wall, as well as when the roof is of constant size—to permit substantially free radial motion between the wall and the roof while preventing rotational movement of the roof on the wall. (Limited circumferential relative motion between the structures is desirable in many instances, as will appear in the sequel.)

The same considerations apply to many vertical or inclined planar walls, as when unrestrained movement on the foundation or relatively to another structure is desirable along a horizontal axis normal to the wall trace but only limited or no movement along said trace should be permitted.

Known designs of shear connections have presented difficulties in the control of the direction and extent of such relative movement between the structures.

It is important to the proper functioning of such shear connections that there be a low coefficient of friction between the conjoined structures. This has been difficult to achieve and maintain in known constructions, and has often led to the use of additional fixtures.

In many installations it is necessary to anchor the conjoined structures, e.g., the supported structure to a foundation or to a wall, to prevent separation or upward movement of the former. This requirement has heretofore made it necessary to provide special hold-down fixtures, such as tension members, to tie the supported structure.

Still another requirement of such shear constructions is often that of sealing the supported structure to the other despite relative horizontal motion, as in the case of a connection between the base of a water tank wall and its foundation. Such a seal must be effective regardless of the position of the wall on the foundation without hindering relative motion. Also, the relatively slidable surfaces of the shear unit should be protected against the entry of foreign matter apt to cause binding or corrosion.

It is the principal object of this invention to provide a structural shear unit suitable for supporting a structure by another while permitting controlled horizontal motion between the structures. A specific object is to provide a shear unit which permits unrestrained horizontal motion between the conjoined structures along one axis but restrains or limits motion perpendicularly to said axis.

A further object is to provide a structural shear unit which has a low coefficient of friction, thereby permitting facile relative motion between the supporting and the supported structures and reducing the stress within such structures.

Another object is to provide a structural shear unit according to any of the preceding objects which anchors the supported structure to the supporting structure, thereby preventing separation of the structures.

Still another object is to provide a connection between structures, such as a foundation and a wall which is supported thereby, or a wall and a roof or beam which is carried thereby, which permits horizontal motion between the structures along an axis normal to the longitudinal direction of one structure (e.g., normal to the wall or to its trace on a horizontal plane) but prevents or limits horizontal relative motion perpendicularly to said axis. Ancillary objects are to provide a reinforced concrete tank having circumferential pre-stressing tendons wherein the tank wall can move radially on its foundation and/or relatively to a roof supported by the wall, but circumferential relative motion is prevented or restricted, e.g., beyond a predetermined limited distance; and to provide a structure wherein the extent of said limited distance is variable in accordance with the radial position of the wall relatively to its foundation and/or the roof.

Still another objects is to provide a connection between a structure and a foundation as specified in the preceding objects wherein the structure, e.g., a tank wall, is sealed to the foundation or to another stationary structure, e.g., a tank floor, and relative horizontal motion between the structure and the foundation or other stationary structure is afforded.

Still another object is to provide a connection between a supporting and a supported structure which comprises one or more shear units for supporting the latter structure while permitting relative horizontal motion, wherein the shear unit or units is (are) protected against entry of foreign matter to prevent binding or seizure of the slide surfaces of the unit or units. A related object is to form the juxtaposed surfaces of the said structures so as to facilitate horizontal relative motion in one direction from an initial or home position without binding between said surfaces.

Additional objects will become apparent from the following description.

In summary, according to a preferred embodiment of the invention, the two structures are connected by one or by a series of shear units, each unit comprising a lower member and an upper member slidably supported on the lower member, the said members being respectively secured to the supporting and to the supported structure, said members having mutually engageable elements, such as pairs of laterally directed abutments extending horizontally generally along the axis of desired free sliding movement, for restraining or limiting horizontal sliding motion between the members in the direction perpendicular to said axis. When one of the structures has a greater structural stability along the longitudinal axis than along the transverse axis thereof, the said units are oriented to place the said slide axis perpendicular to the said longitudinal axis of the structure. For example, when one of the structures is a wall, the said slide axis extends perpendicularly to the wall and motion between the wall and its foundation or roof is restrained along the wall but not perpendicularly thereto.

To reduce friction, an anti-friction pad, such as a sheet of porous metal, e.g., porous bronze, impregnated with a lubricant, is placed between the said members, whereby sliding motion occurs between at least one surface of the lubricated pad and the adjacent member and a low coefficient of friction is attained.

The said mutually engageable elements are preferably positioned to permit a small but limited amount of horizontal sliding motion between the said members perpendicularly to the free slide axis, as by providing small clearances between the opposed abutments. In a preferred embodiment, the said engageable elements on at least one of the members are tapered, i.e., convergent along the slide axis, so that the said clearances and, hence, the extent of limited sliding motion increases as the said upper member slides on the lower member away from an extreme or home position along said slide axis. This facilitates installation of the members in home position in desired relationship while permitting an increased degree of limited sliding moton wihen one of the structures is loaded.

It is desirable to secure the anti-friction pad to one of the members, e.g., to the lower member, as by providing a niche in said one member for receiving the pad and preventing displacement thereof, so that sliding motion occurs essentially only between the outer face of the pad and the other member. It is evident that the anti-friction pad may then be regarded as a part of the former member.

The said members of each shear unit are advantageously provided with interlocking elements that prevent vertical separation of the members, whereby the supported structure is anchored to the other structure. These interlocking elements may be integral with the members or may be constituted in part by separate means, such as bolts fixed to one member and slidably engaged to the other.

In one embodiment the said interlocking elements and the afore-mentioned engageable elements which limits sliding motion are combined.

When the shear unit is applied to a connection which must be sealed, e.g., in the case of a movable tank wall sealed to a tank floor, a strip of elastic sealant is placed between the stationary and movable structures, e.g., in a niche formed in one or both structures. The said strip is compressed when the structures move toward each other and expands when they separate. According to another optional feature, the said tank floor is situated in horizontally spaced relation to the movable tank wall and a stationary filler wall is emplaced between the wall and floor, either before or after the wall is cast or erected, and the said compressible sealing strip is placed between the movable and the filler walls.

Moreover, to prevent foreign matter from reaching the slide surfaces of the shear unit, as well as to prevent obstructing bodies from lodging in the gap between the conjoined structures, an elastic closure strip may be placed into a horizontal niche which is provided between the said structures, e.g., at the outer side in the case of a tank wall mounted on a foundation.

According to a further feature of the invention, binding between the supporting and the supported structures is prevented by inclining the juxtaposed surfaces thereof downwardly in the direction of initial movement of the supported structure from its initial or home position, the inclination being continuous or in steps. This is useful both with supported structures cast at the site or pre-cast structures. In most installations, particularly when of concrete and cast at the site, it is desirable to interpose a suitable bond-breaking means between the said juxtaposed surfaces, such as a sheet of paper or a layer of bond-breaking composition applied by painting the surface of the supporting structure.

The invention will be further described with reference to the accompanying drawings forming a part of this specification and showing certain preferred embodiments by way of illustration, wherein.

Figures 1, 2, 3:
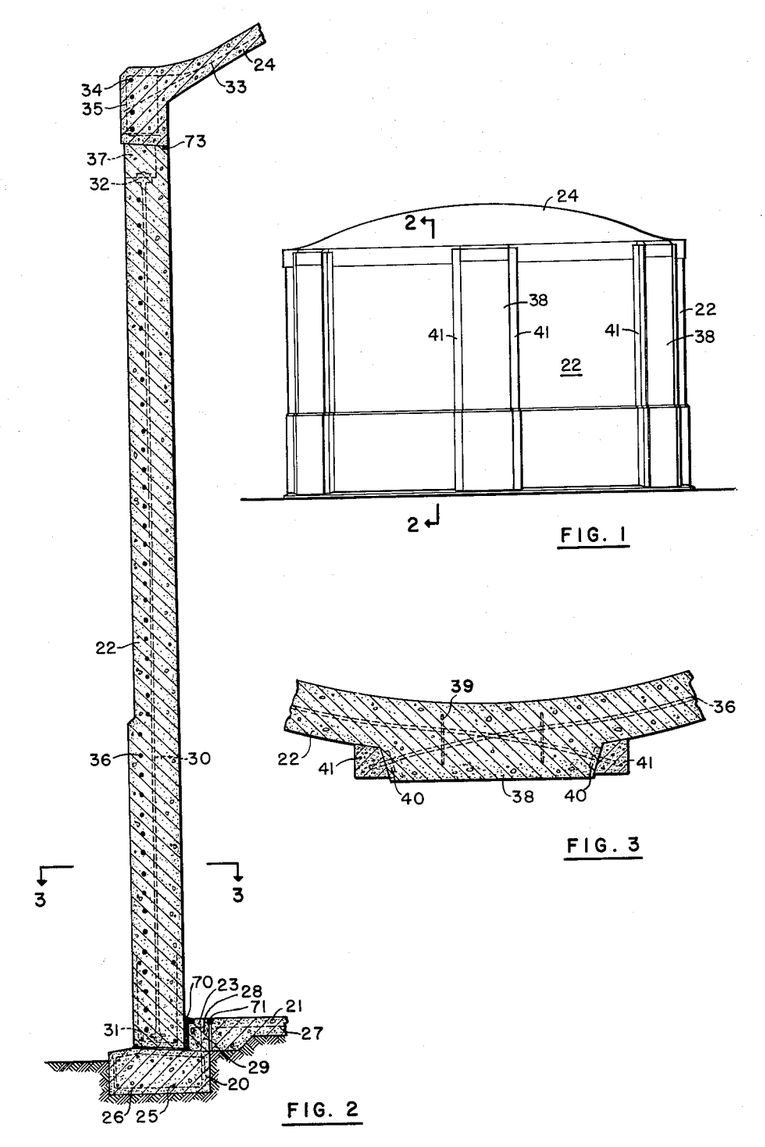
FIGURE 1 is an elevation of a tank to which the invention is applied.
FIGURE 2 is an enlarged vertical sectional view through the tank wall, foundation and a part of the floor, taken on the radial section line 2—2 of FIGURE 1.
FIGURE 3 is a horizontal sectional view taken on the line 3—3 of FIGURE 2, showing the circumferential prestressing tendons.

Referring generally to the first embodiment of FIGURES 1–14, and particularly to FIGURES 1–3, there is shown a tank which includes a concrete foundation 20 embedded in the ground along a circular trace; a concrete tank floor 21; an annular concrete tank wall 22; a stationary concrete filler wall 23 which is cast between the outer edge of the tank floor and the tank wall, either before or after installation of the latter; and a concrete tank roof 24. Steel reinforcing bars are advantageously provided as follows: Bars 25 extending circumferentially through the foundation and surrounded at intervals by bars 26; radial bars 27 in the floor; circumferential bars 28 in the filler wall 23, surrounded at intervals by bars 29; vertical bars 30 in the tank wall, which may be pre-stressed and provided at the top and bottom with suitable anchors 31 and 32; radial bars 33 in the roof, which may also be pre-stressed; circumferential bars 34 in the roof, for pre-stressing, surrounded at intervals by bars 35; and circumferential pre-stressing tendons 36 in the wall 22. The top of the wall may be grouted, as indicated at 37 in FIGURES 2 and 7, after the vertical bars 30 are pre-stressed or post-stressed and anchored.

The circumferential tendons 36 are situated at levels distributed throughout the wall height and each may extend circumferentially through one or more panels between vertical anchoring ribs 38 formed integrally in the wall. As appears in FIGURE 3, the tendons curve outwardly from their circular courses near their ends and extend out through the circumferentially directed faces of the ribs 38; they may be surrounded by reinforcing hoops 39 to prevent outward displacement of the concrete at the ribs when the tendons are tensioned. Post-tensioning is effected by applying tension to the several tendons concurrently or successively, to place the concrete into circumferential compressive stress throughout the height and circumference of the wall, thereby contracting it. The ends of the tendons are anchored in tension by suitable means, e.g., anchor plates 40 fixed to the tendons by frictional grips or cold-formed heads, said plates bearing against the rib faces. A finish strip 41 of concrete or grout is thereafter applied to the said rib faces to cover the tendons. It should be noted that the invention is not restricted to any specific arrangement of the circumferential or other bars, nor to any specific method of applying post-tensioning. Further, the wall may be monolithic or cast in sections which are juxtaposed along vertical joints, said joints being sealed when the circumferential tendons are stressed in tension.

Figure 4:
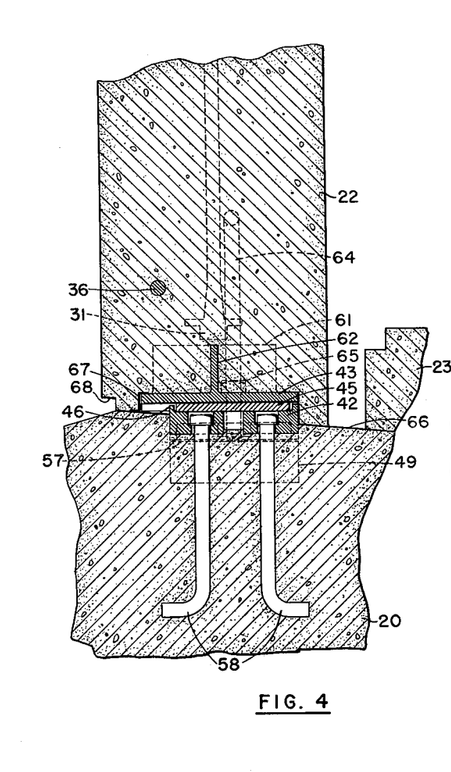
FIGURE 4 is a further enlarged sectional view taken on a radial plane through the foundation and wall at a shear unit, showing the shear unit and wall in home position.
Figure 5:
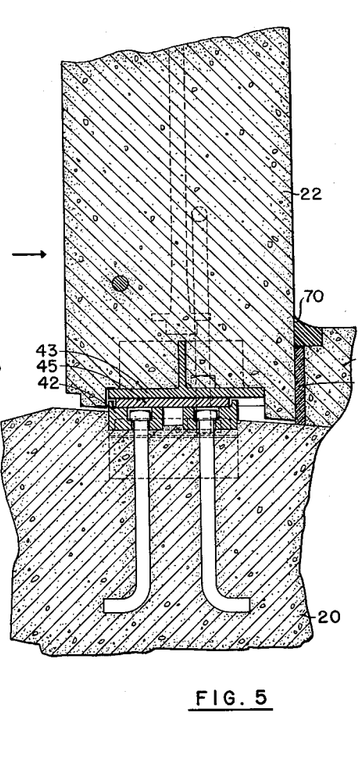
FIGURES 5 and 6 are views of the parts shown in FIGURE 4 and, additionally, the sealing strips, showing, respectively, the wall displaced radially inwards due to prestressing, and the wall moved radially outwards from the FIGURE 5 position due to loading by the contents of the tank.

To permit relative horizontal motion between the supporting foundation 20 and the supported wall 22, a plurality of base shear units is interposed at suitable circumferential intervals, such as three to fifteen feet. FIGURE 2 is taken on a radial plane between such shear units, while FIGURE 4 is taken on a radial plane through one of the units. Referring to FIGURES 4–14, each said unit comprises a lower member 42, fixed to and supported by the foundation, and an upper member 43, resting on the lower member and fixed in supporting relation to the wall. The entire weight of the wall is carried by the several base shear units, which are oriented with their longitudinal or free slide axes radial to the tank.

Each lower member includes: a table 44 presenting an upwardly directed bed for supporting an anti-friction pad 45, e.g., a sheet of porous bronze impregnated with a lubricant, which presents an upwardly directed slide surface; a pair of upwardly projecting flanges 46 at the ends for restraining the pad against longitudinal displacement; a pair of upwardly projecting, longitudinal ribs 47 at the sides of the bed which prevent lateral displacement of the pad and have outwardly directed abutment faces 48 which are tapered, i.e., slightly convergent toward the central longitudinal axis, the member being installed with the direction of convergence toward the center of the tank; and, if desired, a pair of downwardly projecting longitudinal flanges 49. The lower member is formed with a pair of holes 50, situated on the central longitudinal axis for receiving anchor bolts, each hole having at the top thereof a larger square recess 51; a central grouting hole 52; and a pair of longitudinally elongated slots 53 which extend through the ribs 47 and have lateral enlargements 54 at the bottom. The lower member carries, enclosed in each of said slots, a spacer bushing 55 which is welded to an internally threaded nut 56, the latter being slidable but not rotatable within the enlargement 54. (The bushing 55 may optionally be internally threaded.) The slots 53 and enlargements 54 are wider than the bushing 55 and nut 56, respectively, at least by the amount of convergence of the abutment faces 48 through a distance equal to the length of the slots. The said bushing and nut are retained by a sheet-metal closure 57 (FIGURES 4 and 14) which is affixed to the member by welding. The closed space formed by the slots and enlargements may be filled with a lubricant.

The lower member is anchored to the foundation by anchor bolts 58 which are inserted from the top through the holes 50 and have square heads fitting in the recesses 51. The lower ends of the anchor bolts may be turned outward, as appears in FIGURES 4–6. It will be understood that the lower members are installed and levelled before the foundation concrete has set and that the grouting holes 52, when used, insure the absence of void spaces beneath the table, thereby insuring a firm and continuous support.

Each upper member 43 comprises a platform 59 which presents a flat, downwardly directed face for sliding engagement with and support by the surface of the anti-friction pad 45; a pair of longitudinal, marginal, downwardly projecting abutments 60 having inwardly directed abutment faces for engagement with the abutment faces 48 and, preferably, similarly tapered; and, if desired, an upwardly projecting stiffening structure comprising longitudinal and transverse plates 61 and 62, respectively, which extend into the wall and prevent horizontal displacement between the upper members and the wall. The abutments 60 are advantageously positioned to engage the faces 48 when the upper member is in its extreme or home position, i.e., radially outward of the tank, as shown in FIGURE 4. When this member slides radially inwards clearances are formed between the abutments 60 and the said faces, permitting a limited amount of relative transverse sliding motion; however, these parts always prevent or limit motion transversely to the longitudinal free slide axis. The upper member is formed with a pair of holes 63 in alignment with the central parts of the slots 53.

Figure 14:
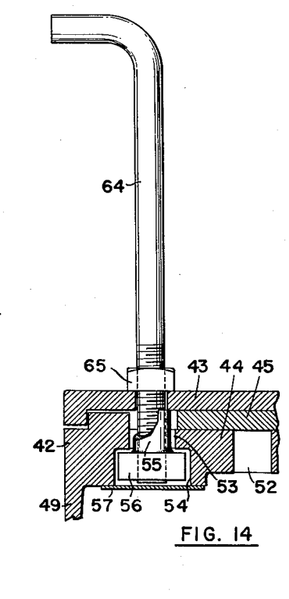
FIGURE 14 is a further enlarged transverse sectional view of a part of the shear unit of FIGURES 4–6, showing details of the engagable elements, the interlocking elements, and of the upper anchor.

The upper member is installed on the lower member prior to emplacing the wall 22 by placing it on the installed lower member and inserting terminally threaded anchor bolts 64, carrying nuts 65, through the holes 63 and screwing them into the nuts 56, as appears in FIGURE 14. These bolts draw the upper ends of the bushings 55 against the platform 59. The lengths of the bushings 55 are such that the nuts 56 remain slightly below the tops of the enlargements 54 for unrestrained movement; but the clearances are small, so that these nuts are effective to prevent upward movement of the upper member relatively to the lower member. The nuts 65 are secured to lock the anchor bolts, which may have their upper ends bent outwards.

To permit inward movement of the wall 22 relatively to the foundation without binding, the latter has its upper surface 66 inclined downwards toward the inside of the tank. When the upper wall is cast at the erection site, a layer of bond-breaking material is applied, e.g., painted on or laid on, the said surface 66 and a sheet metal flashing piece 67 is positioned at the outer end of the upper member to prevent concrete from flowing under the projecting part of the upper member. The wall 22 is cast with a continuous recess 68 at its outer, lower corner. Except for the portions above the base shear units, the lower edge of the wall is inclined in conformity to the surface 66. It is evident that when the wall 22 moves inwards the lower edge thereof recedes from the surface 66, as appears in FIGURE 5.

The filler wall 23 is preferably cast after the wall 22, but may be installed prior thereto. It is spaced from the wall 22 when the latter is in its outer or home position and a strip 69 of highly elastic material, such as cellular rubber, is placed into the interval. The wall 23 is formed with a continuous peripheral recess at its upper outer and upper inner corners. A strip 70 of highly elastic, impervious and, preferably, adherent sealing material, such as a poly-sulfide, e.g., that known as Thiokol, is placed into the former recess to span the gap to the wall 22, being supported by the strip 69. A suitable sealant strip 71, such as oakum or a poly-sulfide, is placed into the latter recess to seal the wall 23 to the tank floor 21.

A plurality of shear units is also installed at suitable circumferential intervals at the top of the wall 22, each comprising a lower member fixed to the said wall and an upper member fixed to the roof 24. These units may be constructed like the base shear units previously described. One such unit, constructed with minor modifications, appears in FIGURE 7; it includes: A lower member 42a which is anchored to the wall 22 by bolts 58a; an upper member 43a, which differs from that previously described in that anchorage to the roof is provided, in addition to anchor bolts 64a, by flanges 72 at the upper edges of the vertical plates 61a and 62a; and an anti-friction pad 45a. A strip 73 of highly elastic, preferably adherent sealant, such as a poly-sulfide, is packed into a continuous recess formed at the inner end of the juncture between the roof and the wall. The said juncture is inclined downwards toward the interior of the tank and the surface 66a of the top of the wall and the juxtaposed bottom portion of the roof are separated by bond-breaking material. Parts described in this paragraph bearing numbers with the suffix "a" are constructed similarly to and correspond to previously described parts with corresponding numbers.

Operation of the shear units is as follows: The upper members 43 and 43a are initially in their radially outer or home positions, shown in FIGURES 4 and 7, prior to stressing of the circumferential bars or tendons 34 and 36. Although stressing of the former often precedes post-stressing of the latter, stressing of the wall and its effect on the base shear units will be first described. When the radius of the wall 22 decreases due to tensioning of the tendons 36 as previously described, the wall base and the upper shear members 43 slide radially inwards along the longitudinal free slide axes on the anti-friction pads 45 with a minimum of restraint. The extreme position appears in FIGURE 5. Because of the slope of the surface 66, the bottom edge of the wall moves away from the said surface and binding between the foundation and wall is obviated. Movement of the upper members (and, hence, of the wall) transversely to said axes is at first prevented by the ribs 60, which engages the abutment faces 48 on the lower member. However, because of the tapers on these mutually engageable elements, a limited amount of transverse motion becomes possible after movement away from home position. This limited motion is desirable because circumferential contraction of the wall 22 due to tensioning of the tendons 36 is often not perfectly uniform, especially when the tendons are tensioned sequentially, and a small amount of circumferential accommodation is necessary to prevent undesired stress on the shear units. During this movement the strips 69 and 70 are compressed between the walls 22 and 23.

Figure 6:
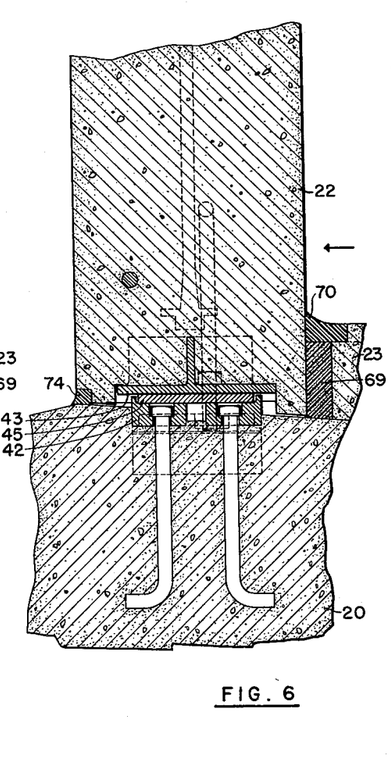
Figures 7, 8, 11:
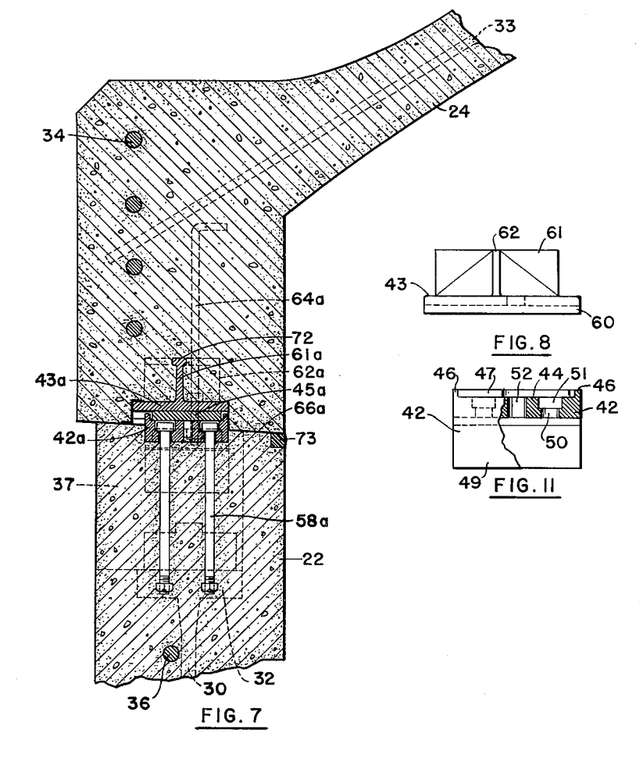
FIGURE 7 is a sectional view taken on a radial plane through the top of the wall and an upper shear unit in its home position, showing further a part of the roof supported thereby.
FIGURE 8 is a side elevation of the upper member of the shear unit of FIGURES 4–6.
FIGURE 11 is a side elevation of the lower member of the shear unit of FIGURES 4–6, parts being broken away.
Figures 9, 10:
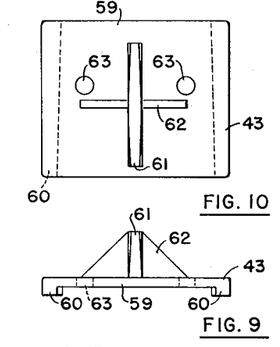
FIGURE 9 is end elevation of the member of FIGURE 8.
FIGURE 10 is a plan of the member of FIGURES 8 and 9.
Figure 12:
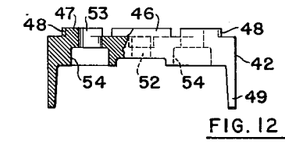
FIGURE 12 is an end elevation of the member of FIGURE 11, parts being broken away.
Figure 13:
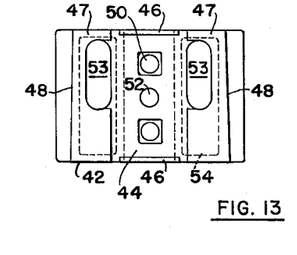
FIGURE 13 is a plan of the member of FIGURES 11 and 12.

When the tank is subsequently filled with liquid, the wall 22 is loaded from the inside and the hydrostatic pressure expands it, causing the upper members 43 to slide outwards to the position shown in FIGURE 6. In this position the upper members do not usually reach their home positions (provided that sufficient stress was applied to the tendons 36) and a limited amount of transverse motion between the upper and lower members is still possible. Also during this outward movement, the strips 69 and 70 expand, the former affording continuing support for the latter and the latter providing a continuing seal. A strip 74 of elastic sealant, such as a poly-sulfide, is packed into the recess 68 at the start of or during this outward movement to close the shear units and the space above the surface 66 against entry of foreign material.

In the event of an earthquake, radial motion of the foundation 20 is negligibly transmitted to the wall 22 because the slide members 43, being away from home positions, can slide either inwards or outwards on the pads 45. However, the ribs 60 and faces 48 prevent more than a limited amount of relative circumferential displacement between the foundation and the wall, so that the latter is shifted along the length thereof when the foundation is moved circumferentially. It is evident that this will result in a small deformation of the wall trace, but this is only a small fraction of the wall radius, particularly in the case of large-diameter tanks for which this invention is especially useful.

The shear units between the top of the wall 22 and the roof 24 function similarly. When the bars 34 are tensioned (in the manner described for the tendons 36) to contract the roof, and/or when the wall 22 is loaded internally and thereby is caused to expand, the upper members 43a slide radially inwards relatively to their supporting lower members 42a; and when the tendons 36 are tensioned to contract the wall, the reverse relative motion occurs.

Figures 15, 16, 17:
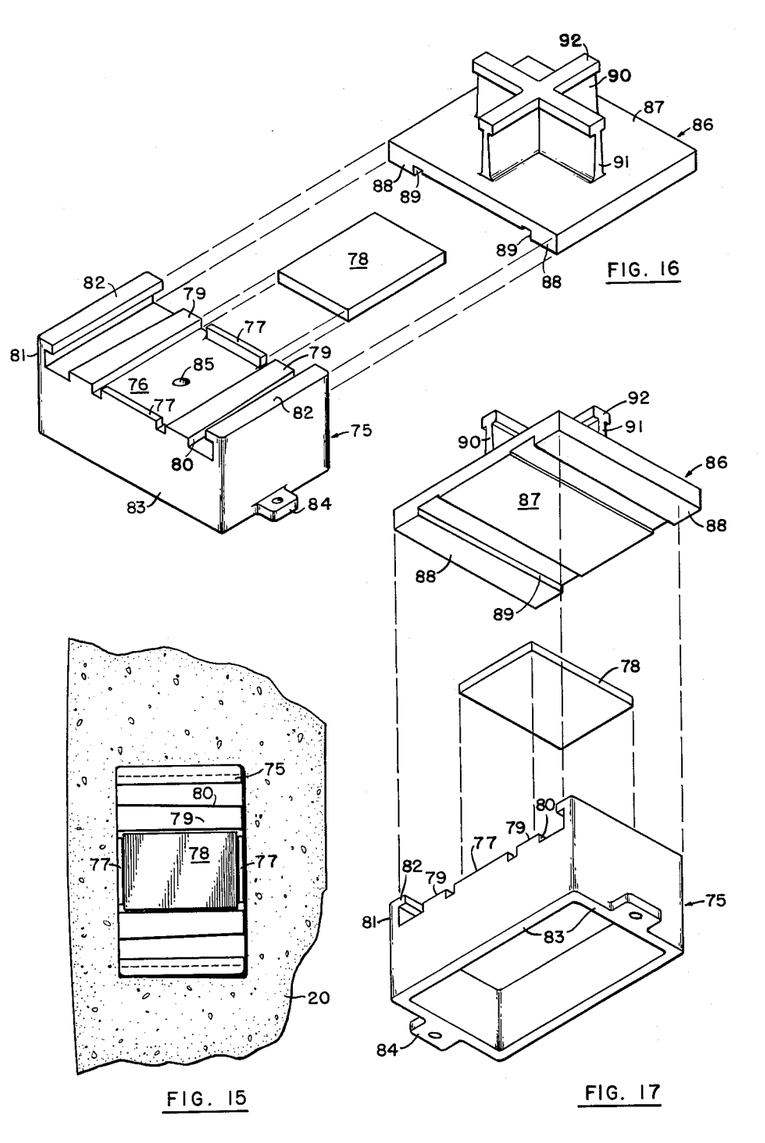
FIGURE 15 is a plan of a part of a foundation and, installed therein, the lower member of a shear unit according to a modified embodiment.
FIGURE 16 is an exploded isometric view of the modified shear unit for FIGURE 15, viewed from the top.
FIGURE 17 is an exploded isometric view of the last-mentioned shear unit, viewed from the bottom.

The shear units may take other forms than those previously described. FIGURES 15–17 show a variant which obviates the need for bolts to prevent vertical separation of the members. Each lower member 75, embedded in and anchored to the foundation 20, includes: a table 76; upstanding end flanges 77 for retaining an anti-friction pad 78; a pair of longitudinal upstanding ribs 79 the inner faces of which position the pad laterally and the outer faces 80 of which are tapered convergently to the central longitudinal axis; upstanding marginal longitudinal walls 81 which carry inwardly protruding flanges 82 spaced above the table; and depending end and side skirts 83 which carry apertured anchoring lugs 84. The table is formed with a grouting hole 85.

The upper member 86 comprises: a platform 87 which presents a flat, downwardly directed face for sliding engagement with and support by the pad 78; a pair of marginal, longitudinal ribs 88 which have inwardly directed abutment faces 89 for engagement with the abutment faces 80 and preferably similarly tapered to engage the latter faces simultaneously when the upper member is in home position; and upwardly projecting longitudinal and transverse stiffening and anchoring plates 90 and 91 which have flanges 92 at the top for embedment in the supported structure. The marginal strips of the platform 87 and the ribs 88 are of thickness to slide under the flanges 82 with a slight clearance both below and above the upper member, so as to permit facile longitudinal movement while providing interlocking elements which prevent upward movement of the upper member.

It is evident that the abutment faces 80 and 89 restrict movement of the upper member transversely with respect to the lower member. The extent of this transverse movement permitted by said faces increases as the upper member moves away from home position. Operation is as was described for the previous embodiment.

Although the shear units according to the invention were described as applied to a concrete tank which is cast on the erection site, it is evident that they may be used with other structures, such as flat walls and with walls which are pre-cast and assembled to other walls and to the shear units.

We claim as our invention:

1. A structural shear unit which comprises:
   (a) a lower member adapted for fixed attachment to a supporting structure and presenting an upwardly directed, horizontal slide surface,
   (b) an upper member adapted for fixed and supporting attachment to a supported structure and presenting a downwardly directed slide surface which is slidingly supported on said slide surface of the lower member, said upper member being freely slidable on the lower member along a free-slide axis and transversely to said axis, and
   (c) means on said members for restraining horizontal sliding movement therebetween transversely to said free-slide axis while permitting free sliding motion along the axis including:
      (1) first laterally directed abutment elements on the lower member elongated in the direction of said free-slide axis, and
      (2) second laterally directed abutment elements on the upper member similarly elongated and positioned for engagement with the first abutment elements in both directions transverse to said axis,
      (3) said elements being substantially unobstructed along their lengths to permit extended relative motion between the members along said axis, and
      (4) the mutually engageable elements on different members being spaced apart transversely to said axis to provide a clearance therebetween sufficient, in at least one relative longitudinal position of said members, to permit a substantial but limited relative movement between the said members transversely to said axis.

2. A shear unit as defined in claim 1 wherein both sets of abutment elements on the respective members are convergent toward said axis, whereby the extent of said limited transverse motion is variable in accordance with the longitudinal position of the upper member.

3. A structural shear unit which comprises:
   (a) a lower metallic member including
      (1) a table presenting an upwardly directed face, and
      (2) means adapted to anchor said member to a supporting structure,
   (b) an upper metallic member including
      (1) a supporting platform presenting a downwardly directed face, and
      (2) means adapted to anchor said member to a supported structure,
   (c) an anti-friction pad of porous metal impregnated with a lubricant, said pad being
      (1) positioned between and in engagement with both said faces so as to support the upper member from the lower member, and
      (2) slidable with respect to one of said members along a free-slide axis and also transversely to said axis, and secured to the other against sliding, and
   (d) means on said members for restraining sliding motion therebetween transversely to said free-slide axis while permitting free sliding motion along the said axis, and
      (1) first laterally directed abutment elements on the lower member elongated in the direction of the free-slide axis, and
      (2) second laterally directed abutment elements on the upper member similarly elongated and positioned for engagement with the first abutment elements in both transverse directions,
      (3) said elements being substantially unobstructed along their lengths to permit extended relative motion between the members along said axis, and
      (4) the mutually engageable elements on different members being spaced apart transversely to said axis to provide a clearance therebetween sufficient, in at least one relative longitudinal position of said members, to permit a substantial but limited relative movement between the said members transversely to said axis.

4. A structural shear unit as defined in claim 3 wherein said members have interlocking surfaces elongated in the direction of the free-slide axis, the surface on the upper member being upwardly directed and engageable with the surface on the lower member, the latter surface being downwardly directed and above the former surface, for preventing vertical separation of said members.

5. A composite structure which comprises:
   (a) an elongated supporting structure having an upper surface,
   (b) an elongated supported wall structure above said supporting structure and having a lower surface, and
   (c) a plurality of structural shear units interposed between said structures at intervals along the length of said structures and supporting the latter from the former, each said shear unit including
      (1) a lower member fixed to said supporting structure,
      (2) an upper member fixed to said supported structure and slidably supported on said lower member for sliding along a principal axis which is normal to the elongation of said supporting structure, and
      (3) mutually engageable abutment elements on said members for restraining sliding motion therebetween in the directions along the length of said supported structure while permitting free sliding motion along said principal slide axis, said elements being elongated in the direction of said principal axis and substantially unobstructed along their lengths to permit relative motion between said members along said principal axis.

6. A composite structure as defined in claim 5 wherein said lower and upper members have engaged slide surfaces disposed for substantially horizontal relative sliding motion transversely to said length, said upper surface of the supporting structure and said lower surface of the supported structure are juxtaposed in close proximity to each other, and the said surfaces are parallel and inclined downwards in a direction transverse to the elongation of the supporting structure, whereby said surfaces will move apart when the supported structure moves in the said transverse direction.

7. In combination with the composite structure defined in claim 5, wherein said supporting structure is a foundation, an auxiliary wall extending along the foundation in laterally spaced relation to said supported wall structure, and a strip of highly elastic sealing material interposed between said supported wall structure and said auxiliary wall.

8. A concrete tank which comprises:
   (a) an annular concrete foundation,
   (b) an annular stressed concrete tank wall mounted above said foundation, and
   (c) a plurality of structural base shear units interposed between said foundation and wall at circumferential intervals and supporting the latter from the former, each said shear unit including
(1) a lower member fixed to said foundation and including an anti-friction pad having an upwardly directed slide surface,
(2) an upper member fixed to said wall and having a downwardly directed surface slidably supported on said slide surface and being slidable in the radial direction of the tank wall, and
(3) mutually engageable abutment elements on said members for restraining sliding motion therebetween circumferentially of the tank while permitting free sliding motion radially of the tank, said elements being elongated in said radial direction and substantially unobstructed along their lengths to permit relative radial movement between the members.

9. A concrete tank as defined in claim 8 wherein said wall includes circumferential stressing tendons and means for anchoring said tendons in tension, whereby said tank wall moves radially inwards relatively to the foundation by sliding movements of said upper members on the lower members when said tendons are tensioned and said wall moves radially outwards with opposite sliding movements of said upper members when the tank wall is loaded internally.

10. A concrete tank as defined in claim 8 wherein the said mutually engageable elements are spaced apart with small clearances in the circumferential direction of the tank wall at least in some radially relative positions of the upper and lower members to permit substantial but limited circumferential motion between the foundation and wall.

11. A concrete tank as defined in claim 8 wherein said slide surfaces are substantially horizontal in the radial direction, said foundation and wall have closely juxtaposed surfaces and the said juxtaposed surfaces are inclined downwardly in a radial direction of the tank, whereby the said surfaces move apart when the wall moves in the said radial direction relatively to the foundation.

12. A composite structure which comprises:
(a) a supporting structure,
(b) a supported structure above said supporting structure,
(c) said structures having closely juxtaposed surfaces which are parallel and inclined downwardly in a common direction, and
(d) a shear unit interposed between said structures and supporting the latter from the former, including
(1) a lower member fixed to the supporting structure,
(2) an upper member fixed to the supported structure and slidably supported on the lower member for horizontal relative motion along said common direction, and
(3) means restraining sliding motion between said members transversely to said common direction while permitting free sliding motion of the upper member in the said common direction.

13. A concrete tank comprising:
(a) a concrete tank wall,
(b) a concrete roof supported by said wall, and
(c) a plurality of shear units interposed between said wall and roof at intervals along the length of said wall and supporting the latter from the former, each said shear unit including
(1) a lower member fixed to said wall,
(2) an upper member fixed to said roof and slidably supported on said lower member for sliding motion radially of the tank, and
(3) mutually engageable abutment elements on said members for restraining sliding motion therebetween circumferentially of the tank while permitting free sliding motion radially of the tank, said elements being elongated in the radial direction and substantially unobstructed along their lengths to permit relative radial movement between the members.

14. A structural shear unit which comprises:
(a) a lower member adapted for fixed attachment to a supporting structure and presenting an upwardly directed, horizontal slide surface,
(b) an upper member adapted for fixed supporting attachment to a supported structure and presenting a downwardly directed slide surface which is slidingly supported on said slide surface of the lower member, said upper member being freely slidable on the lower member along a free-slide axis and transversely to said axis,
(c) means of said members for restraining horizontal sliding movement therebetween transversely to said free-slide axis, and
(d) an anchor which extends vertically through a slot elongated along said free-slide axis and formed in one of said members and extends thence through the other member and beyond the latter for anchoring engagement with the structure which is fixed to the latter member, said anchor
(1) being slidable with respect to said one member in a direction parallel to said free-slide axis along said slot through an extended distance, said slot being wider than said anchor, whereby the anchor is movable relatively to said one member transversely to said axis through a lesser distance, and
(2) having means securing the anchor to said one member against vertical movement of the anchor in the direction toward the said other member.

15. In combination with the shear unit defined in claim 14, wall means on the side of said one member which is remote from the other member defining a closed housing about said slot for said enlargement on the anchor and adapted to contain a lubricant.

16. A structural shear unit which comprises:
(a) a lower metallic member including
(1) a table presenting an upwardly directed face, and
(2) means adapted to anchor said member to a supporting structure,
(b) an upper metallic member including
(1) a supporting platform presenting a downwardly directed face, and
(2) means adapted to anchor said member to a supported structure,
(c) an anti-friction pad of porous metal impregnated with a lubricant, said pad being
(1) positioned between and in engagement with both said faces so as to support the upper member from the lower member, and
(2) slidable with respect to one of said members and secured to the other against sliding, and
(d) at least one rib on one of said members extending longitudinally and projecting therefrom toward the other member and presenting a pair of laterally directed, opposed abutment faces, and a mating pair laterally directed abutment faces on the other member laterally engageable with the abutment faces of said rib, each pair of faces of the same member being convergent toward a longitudinal axis therebetween and substantially parallel to the free-slide axis, each of said faces being parallel to the mating faces of the other member and substantially unobstructed along their lengths for restraining sliding motion between said members to a variable extent in accordance with the longitudinal relation of said members while permitting free relating sliding motion along said free-slide axis.

(References on following page)

References Cited by the Examiner

UNITED STATES PATENTS

| | | | |
|---|---|---|---|
| 1,138,394 | 5/1915 | Mueser | 52—247 |
| 1,301,154 | 4/1919 | Mueser | 52—247 |
| 1,552,569 | 9/1925 | Schurman | 52—698 |
| 1,781,517 | 11/1930 | McKeown | 52—644 |
| 1,814,627 | 7/1931 | Allen | 248—19 |
| 2,002,934 | 5/1935 | Collins | 52—167 |
| 2,014,643 | 9/1935 | Bakker | 52—167 XR |
| 2,433,652 | 12/1947 | Crom | 52—245 |
| 2,680,259 | 6/1954 | Milk | 14—16 |
| 2,932,964 | 4/1960 | Dobell | 52—224 |
| 2,939,364 | 6/1960 | Doswell et al. | 248—224 |

FOREIGN PATENTS 537,726  10/1955  Belgium.

OTHER REFERENCES

Engineering News Record of Apr. 13, 1961, p. 137.

FRANK L. ABBOTT, *Primary Examiner.*

JACOB L. NACKENOFF, HENRY C. SUTHERLAND,
*Examiners.*